Nov. 12, 1929.  K. C. RANDALL  1,735,179
ELECTRICAL APPARATUS
Filed April 11, 1927
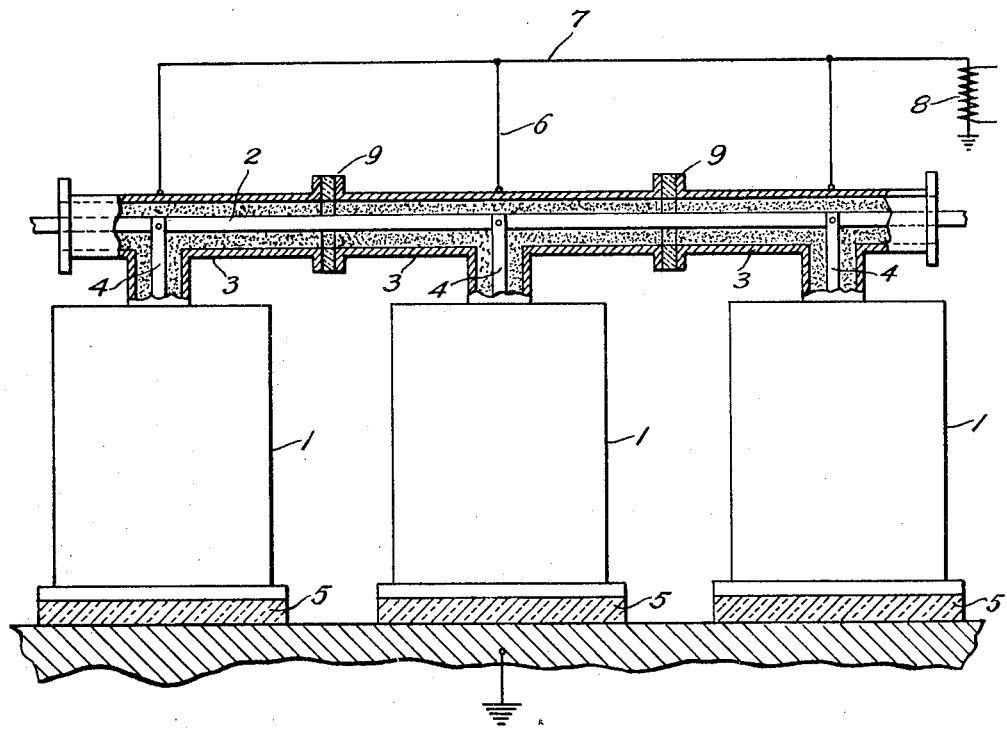
WITNESSES:
INVENTOR
Karl C. Randall
BY
ATTORNEY Patented Nov. 12, 1929

1,735,179

UNITED STATES PATENT OFFICE

KARL C. RANDALL, OF EDGEWOOD, PENNSYLVANIA, ASSIGNOR TO WESTINGHOUSE ELECTRIC & MANUFACTURING COMPANY, A CORPORATION OF PENNSYLVANIA

ELECTRICAL APPARATUS

Application filed April 11, 1927. Serial No. 182,617.

My invention relates to electrical apparatus, and particularly to that type known as the armour-clad compound-filled switch mechanism.

In this type of equipment, particularly of the isolated phase, it is obviously desirable in order to minimize impedance in the bus-bars to use non-magnetic enclosing metal. To minimize eddy-current losses it is found desirable that this metal have a very high specific resistance, and it can be seen that in case of a fault to ground in a unit far removed from the nearest ground connection, the fault current flowing through this high resistance may develop a potential to ground high enough to endanger an operator who touches the unit at the instant the fault ground is flowing.

It is an object of my invention to provide a system for grounding such electrical apparatus that shall positively protect an operator in case of a fault to ground in any unit.

It is another object of my invention to provide an electrical apparatus comprising a plurality of isolated units insulated from one another and each having a separate connection to ground.

Another object of my invention is to provide insulation between sections of a plurality of compound-filled switch structures that shall prevent circulating currents in the metallic casings of such structures, and to provide a low-resistance path to ground for the fault currents of any section.

Another object of my invention is to provide an enclosed switch mechanism having a plurality of units wherein relatively short paths to ground are provided for fault currents.

These and other objects that may be apparent throughout the following description of my invention are attained by means of the apparatus hereinafter described and illustrated in the accompanying drawing herein.

The single figure is an elevational view, partly in section of a switch mechanism embodying my invention.

In practicing my invention, I provide a plurality of non-magnetic casings enclosing a circuit breaker, bus-bars, contact members for connecting the circuit breaker with the bus-bars, and other apparatus, usually provided with this type of equipment. I also provide insulation disposed between the casings for separately electrically insulating each casing, and a grounding system for effectively grounding each casing.

Referring to the drawings, I provide a plurality of non-magnetic metal casings 1, having a circuit breaker, contact members and the usual apparatus disposed therein. Bus bars 2, disposed in portions 3 of the casings 1, having leads 4 for connection to the respective circuit breakers disposed in the casings 1.

The casings 1 are insulated from ground, as is shown by 5, and are insulated from each other as shown by 9. Each of the portions 3 of the casings 1 is provided with a lead 6 for connection to a common ground wire 7 for separately grounding each of the casings 1, and thereby directly grounding fault currents originating in any casing and preventing the fault current from flowing through adjacent casings.

The transformer 8 is provided for connection in the ground wire 7 for operating a relay (not shown) in case of any fault from the casings to ground.

The ground wire 7 has a resistance, small compared to that of the non-magnetic metal of which the casings 1 are constructed and as the units are individually insulated from one another, the circulating currents which might otherwise be induced between sections are broken up. If the insulation between the casings and the circuit conductors fails in any unit, the low resistance ground connection prevents the development of a voltage drop high enough to endanger an operator who may touch the unit at the instant the fault current is flowing.

Accordingly, I have provided a plurality of isolated non-magnetic casings having electrical apparatus disposed therein, and a system for grounding each of the casings through a common ground wire, thereby providing protection for an operator, the grounding system being simple, inexpensive and effective in operation.

While I have described and illustrated but one embodiment of my invention, it will be apparent to those skilled in the art that certain changes, modifications, substitutions, additions and omissions may be made in the apparatus above described, without departing from the spirit and scope of the appended claims.

I claim as my invention:

1. An electrical system comprising a polyphase circuit, a plurality of service apparatus units for each phase, the apparatus and connecting conductors of each phase being separately enclosed in a plurality of metal casings, each casing being electrically insulated from the others, and a common ground-wire for electrically grounding all the apparatus casings through paths not traversing said conductor casings.

2. An electrical system comprising a plurality of isolated non-magnetic metallic casings, the casings being separately insulated from each other, a mechanically continuous duct for interlinking said casings, and a single circuit for electrically grounding all the casings through a path not involving any part of said duct.

3. An electrical system comprising a plurality of non-magnetic metallic casings, each casing being electrically insulated from the other, a mechanically continuous duct for joining said casings, a ground transformer, a common ground-wire, and connections from each casing to said common ground-wire for grounding all of the casings through the transformer by a path not involving said duct.

4. An electrical system comprising apparatus units spaced apart, conductors interconnecting said units, a casing enveloping said units and conductors in a mechanically continuous inclosure having an impedance higher than that of said conductors and a bus having an impedance less than that of said enclosure connected thereto adjacent a plurality of said apparatus units.

5. An electrical system comprising apparatus units spaced apart, conductors interconnecting said units, a casing enveloping said units and conductors in a mechanically continuous enclosure, insulating sectors in the walls of said enclosures disposed to sub-divide it electrically into a plurality of series-related sections and a ground-bus connected to each of said sections.

6. In combination with an electrical system having line conductors enclosed in metal casings, apparatus units connected to said line conductors and having electrically isolated metal casings, and a common path not involving said conductor casings for the current to ground from all said apparatus casings.

7. In combination with an electrical system having line conductors enclosed in metallic casings, apparatus units connected to each line conductor and having electrically isolated metal casings, and a path from each apparatus casing to ground separate from said line conductor casings.

8. In combination with an electrical system having line conductors enclosed in metal casings, apparatus units individual to each line conductor and having electrically isolated metal casings, and a common path not involving said conductor casings for the current to ground from all said apparatus casings.

9. In combination with an electrical system having line conductors enclosed in metal casings, apparatus units connected to said line conductors and having electrically isolated metal casings, a common path not involving said conductor casings for the current to ground from all said apparatus casings, and a current responsive device in said common path.

10. In combination with an electrical system having line conductors enclosed in metal casings, service apparatus units having metal casings electrically isolated from said conductor casings, and a path from each apparatus casing to ground independent of said conductor casings.

In testimony whereof, I have hereunto subscribed my name this second day of April, 1927.

KARL C. RANDALL.